United States Patent [19]

Esterowitz et al.

[11] Patent Number: 5,014,279
[45] Date of Patent: May 7, 1991

[54] LASER DIODE PUMPED, ERBIUM-DOPED, SOLID STATE LASER WITH HIGH SLOPE EFFICIENCY

[75] Inventors: Leon Esterowitz, Springfield; Roger E. Allen, Alexandria, both of Va.; Gregory J. Kintz, Mountain View, Calif.

[73] Assignee: The United States of America as represented by the Secretary of the Navy, Washington, D.C.

[21] Appl. No.: 429,426

[22] Filed: Oct. 31, 1989

[51] Int. Cl.$^5$ .................................................. H01S 3/16
[52] U.S. Cl. ...................................... 372/41; 372/71; 372/75
[58] Field of Search ........... 127/303.1; 372/68, 39–41, 372/71, 75

[56] References Cited

U.S. PATENT DOCUMENTS

| | | | |
|---|---|---|---|
| 4,110,702 | 8/1978 | Chicklis | 372/41 |
| 4,321,559 | 3/1982 | Esterowitz et al. | 372/41 |
| 4,676,583 | 6/1987 | Hicks, Jr. | 350/96.15 |
| 4,707,893 | 1/1989 | Dixon | 372/66 |
| 4,852,117 | 7/1989 | Po | 372/97 |
| 4,852,567 | 8/1989 | Sinofsky | 128/303.1 |

OTHER PUBLICATIONS

Kintz et al, *Appl. Phys. Lett.* vol. 50(22) Jun. 1, 1987 "CW and pulsed 2.8 μm Laser emission from Diode-Pumped Er$^{3+}$:LiYF$_4$. . . ".

*Primary Examiner*—Frank Gonzalez
*Assistant Examiner*—Galen J. Hansen
*Attorney, Agent, or Firm*—Thomas E. McDonnell; George Jameson

[57] ABSTRACT

A laser and method for producing a laser emission at a wavelength of substantially 2.8 microns is disclosed. In a preferred embodiment of the invention, the laser comprises laser diode means for emitting a pump beam at a preselected wavelength; a crystal; and a laser cavity defined by first and second reflective elements at opposing ends of the crystal to form a reflective path therebetween; the crystal having a preselected host material doped with a predetermined percent concentration of erbium activator ions sufficient to produce a laser emission at substantially 2.8 microns when the crystal is pumped by the laser diode means, a portion of the laser emission at substantially 2.8 microns being outputted from one of the first and second reflective elements at a slope efficiency of at least 5 percent, but preferably 10 percent, when the crystal is pumped by the pump beam.

30 Claims, 2 Drawing Sheets

LASER LEVEL DIAGRAM WITH UPCONVERSION

SLOPE EFFICIENCY DATA
30% Er:LiYF4

LASER DIODE PUMPED, ERBIUM-DOPED, SOLID STATE LASER WITH HIGH SLOPE EFFICIENCY

BACKGROUND OF THE INVENTION

1. Field of the Invention

The present invention relates to lasers and particularly to a laser diode pumped 2.8 micron solid state laser with high slope efficiency at or near room temperature.

2. Description of the Prior Art

It is well known that the human body is comprised of approximately 70% water, with various human tissues containing about 60% to 90% of water, and bone and cartilage containing about 30% to 40% of water. Since the 2.8 micron wavelength has a substantially maximum absorption in water, this 2.8 micron wavelength is the ideal wavelength to use for a large variety of medical laser applications on the human body. The 2.8 micron wavelength also offers a controlled absorption or penetration depth of, for example, one micron in the human body. As a result, this 2.8 micron wavelength is extremely useful in surgical applications where very precise cuts in area and/or depth are needed while minimizing damage to good tissue, bone and/or cartilage adjacent to, or under, the area to be ablated. A 2.8 micron wavelength laser could be used for precise surgery in such exemplary applications as brain surgery, neurosurgery, eye surgery, plastic surgery, burn treatment and the removal of malignancies.

Current lasers for generating this 2.8 micron wavelength use a variety of host or lasant materials with various pumping techniques for exciting the lasant material. Typically these lasers are flash lamp pumped. Such flash lamp pumped lasers are large, inefficient and expensive.

The present inventors attempted to develop a miniaturized 2.8 micron laser using a diode-pumped, 8% erbium-doped YLiF$_4$ crystal laser. Such a laser barely produced a continuous wave (CW) output and only had a slope efficiency of 0.7%. This previous laser is described in an article entitled "CW and Pulsed 2.8 $\mu$m Laser Emission from Diode-Pumped Er$^{3+}$:LiYF$_4$ at Room Temperature" by G. J. Kintz, R. Allen, and L. Esterowitz, published in Appl. Phys. Letts., Vol. 50 (22), pp. 1553-1555 (June 1, 1987).

OBJECTS OF THE INVENTION

Accordingly, one object of the invention is to efficiently generate a laser emission at a wavelength of substantially 2.8 microns with a high slope efficiency at or near room temperature.

Another object of the invention is to provide a diode pumped, 2.8 micron solid state laser and method for operating same.

Another object of the invention is to provide an improved laser diode pumped solid state laser operating at a wavelength of substantially 2.8 microns.

Another object of the invention is to provide an improved, compact, economical, high efficiency, laser diode pumped, 2.8 micron solid state laser.

Another object of the invention is to provide a laser diode pumped, 2.8 micron solid state laser with a high slope efficiency.

Another object of the invention is to provide a continuous wave, laser diode pumped, erbium-doped, solid state laser for producing a continuous wave laser emission at a wavelength of substantially 2.8 microns.

Another object of the invention is to provide a pulsed, laser diode pumped, erbium-doped, solid state laser for producing laser emission pulses at a wavelength of substantially 2.8 microns.

A further object of the invention is to provide a diode pumped Er:LiYF$_4$ continuous wave or pulsed laser at substantially 2.8 microns with at least 5% slope efficiency, but preferably with at least 10% slope efficiency.

SUMMARY OF THE INVENTION

These and other objects of the invention are achieved by providing a laser diode pumped, solid state laser which comprises at least one laser diode or laser diode array for emitting a pump beam at a preselected wavelength; a crystal; and a laser cavity defined by first and second reflective elements at opposing ends of the crystal to form a reflective path therebetween; the crystal having a preselected host material doped with a predetermined percent concentration of erbium activator ions sufficient to produce a laser emission at substantially 2.8 microns when the crystal is pumped by the pump beam, a portion of the laser emission at substantially 2.8 microns being outputted from one of the first and second elements at a slope efficiency of at least substantially 5% when the crystal laser is pumped by the pump beam.

The host material can be an exemplary YLiF$_4$ or BaY$_2$F$_8$ material which is doped with a predetermined percent concentration of erbium activator ions between 25% and 65%. The preselected wavelength of the pump beam can be an exemplary 797 nm.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

It is known that when an erbium-doped LiYF$_4$ crystal is pumped with a laser beam that that crystal will produce a laser emission at a wavelength of 2.8 microns.

Figure 1:
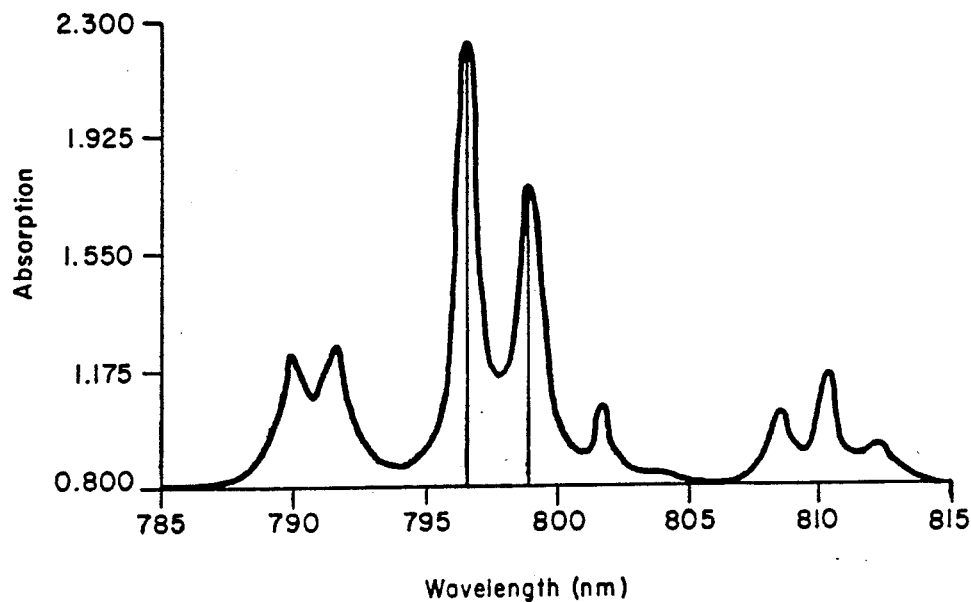
FIG. 1 illustrates the absorption spectrum of erbium for a spectrum of wavelengths of erbium.

Referring now to the drawings, FIG. 1 illustrates the erbium absorption spectrum for an erbium-doped LiYF$_4$ crystal. In other words, this erbium-doped crystal absorbs laser pump power at the various wavelengths shown. Note that the maximum absorption in the erbium-doped LiYF$_4$ crystal occurs when the crystal is pumped with a pump beam at a wavelength of substantially 797 nm. As a result, the erbium-doped LiYF$_4$ crystal can be most efficiently pumped by a laser diode source which produces a pump beam at a wavelength of 797 nm. However, as indicated in FIG. 1, it should be realized that wavelengths close to 797 nm, such as 798 nm and 799 nm (where a secondary absorption peak occurs), may also be suitable for pumping the erbium-doped crystal.

Figure 2:
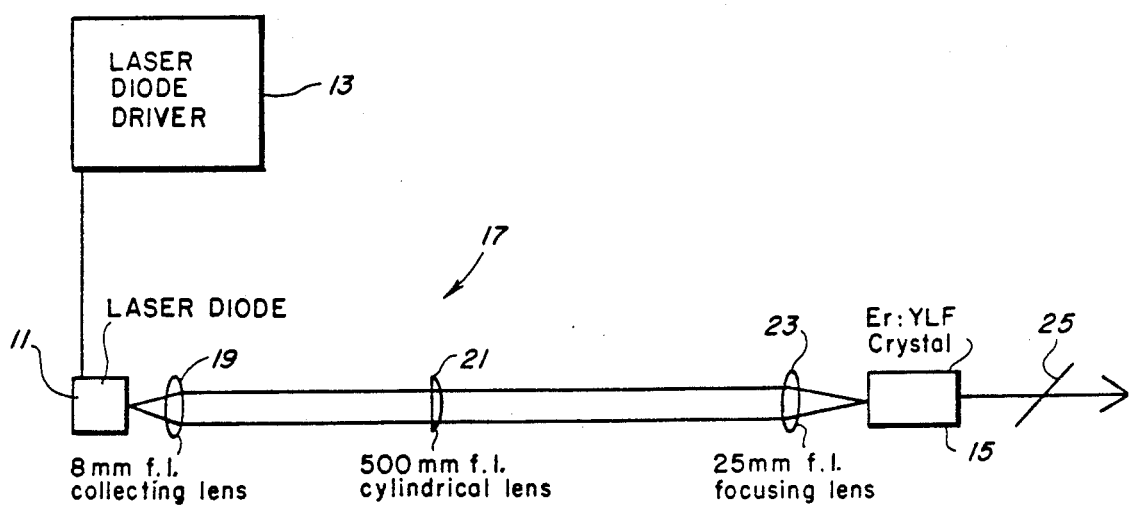
FIG. 2 illustrates a preferred embodiment of the invention.

Referring now to FIG. 2, a preferred embodiment of the invention is shown. In FIG. 2 a laser diode 11 is driven by a laser diode driver 13 to develop a pump beam at a preselected wavelength of preferably 797 nm to pump an erbium-doped yttrium lithium floride (Er:YLF) crystal 15.

The laser diode 11 can comprise one or more single lasers or even one or more laser diode arrays, with each laser diode preferably being a gallium aluminum arsenide (GaAlAs) diode providing a laser emission at a wavelength at 797 nm. For purposes of this description, the laser diode 11 is a 200-mW Spectra Diode Lab 10-stripe, multi-mode laser diode array driven by a Spectra Diode Lab 800 laser diode driver 13. The laser diode 11 develops a room temperature pump beam at 797 nm with a 3 nm spectral bandwidth.

The laser diode 11 is encapsulated in an enclosure (not shown). Also included inside the enclosure is a thermal-electric device (not shown) which is operated as a cooler to stabilize the temperature of the laser diode 11 at or near room temperature. The laser diode driver 13 can be operated in a continuous wave (CW) or pulsed mode.

An optical system 17 is utilized to collect and focus the pump beam from the laser diode 11 into the crystal 15 to essentially match the pump beam to the cavity mode of the erbium-doped crystal 15. This optical system 17 is comprised of lenses 19, 21 and 23. Lens 19 is an 8 millimeter (mm) microscope objective lens, antireflection-coated for 780-830 nm, for collecting the pump beam from laser diode 11. Lens 21 is a 500 mm cylindrical lens for collimating the collected pump beam. Lens 23 is a 25 mm focusing lens for matching the collimated pump beam to the cavity mode of the erbium-doped crystal 15. It should, however, be realized that the types and sizes of the lenses 19, 21 and 23 in the optical system 17 shown in FIG. 2 could be changed, depending on a different laser configuration.

The Er:YLF crystal 15 is a 30% erbium-doped LiYF$_4$ crystal, 8 mm long, with high reflectivity coatings (not shown) on opposite end faces (not shown) to form a monolithic laser cavity (not shown). One end face is flat and coated for 100% reflectance at 2.8 microns and 76% transmission at 797 nm, which corresponds to the absorption peak of the Er:YLF crystal 15. The other end face is concave with an 11 mm radius of curvature and coated for 99.7% reflectance at 2.8 microns. The TEM$_{00}$ mode of the cavity has a 100 micron beam diameter at the flat surface and a divergence of 20 mrad.

In the embodiment shown in FIG. 2, the yttrium lithium fluoride (YLF) material of the crystal 15 forms the laser host material or lasant material which is doped with a 30% concentration of erbium, which is the activator material. Upon being pumped by the pump beam at the wavelength of 797 nm, the Er:YLF crystal 15 produces a laser emission at substantially 2.8 microns with a slope efficiency of at least 5%, but preferably at least 10% (to be discussed). A germanium filter 25 can be disposed at the output of the crystal 15 to block any laser diode emission at 797 nm from the crystal 15, as well as emission at 1.5 microns from the crystal 15 due to the $^4I_{13/2}$ to $^4I_{15/2}$ laser transition in Er$^{3+}$ (to be discussed).

At the 30% erbium concentration in the YLF host material of the crystal 15, an advantageous upconversion process (to be discussed) takes place and aids in the laser operation of the crystal 15. In addition, better mode matching is also achieved in the crystal 15 at this 30% concentration of the erbium activator in the crystal 15.

It should be noted at this time that experiments and calculations have indicated that the optimum percent concentration of the erbium activator (or erbium activator ions) is between 25% and 65% erbium in YLF. It should also be noted that, in addition to YLF, other laser host materials can be employed in the crystal 15, such as BaY$_2$F$_8$ (barium yttrium fluoride), GSGG (gadolinium scandium gallium garnet), GSAG (gadolinium scandium aluminum garnet), KY$_3$F$_{10}$ (potassium yttrium fluoride), YF$_3$ (yttrium fluoride), Na$_{.4}$Y$_{.6}$F$_{2.2}$ (sodium yttrium fluoride) and similar fluoride and oxide host materials with Debye temperatures comparable to that of LiYF$_4$. Each of these laser host materials would also be doped with a percent concentration of erbium activator ions between 25% and 65%. By the use of the term "percent concentration of erbium activator ions" it is meant the percent of substitution of the yttrium ions in LiYF$_4$, BaY$_2$F$_8$, KY$_3$F$_{10}$, YF$_3$ or Na$_{.4}$Y$_{.6}$F$_{2.2}$ by the erbium (Er) activator ions or the percent of substitution of the gadolinium ions in GSGG or GSAG by the Er activator ions. For example, with a 30% concentration of erbium activator ions selected, erbium would replace 30% of the yttrium in the LiYF$_4$ or BaY$_2$F$_8$, or would replace 30% of the gadolinium in the GSGG or GSAG.

Figure 3:
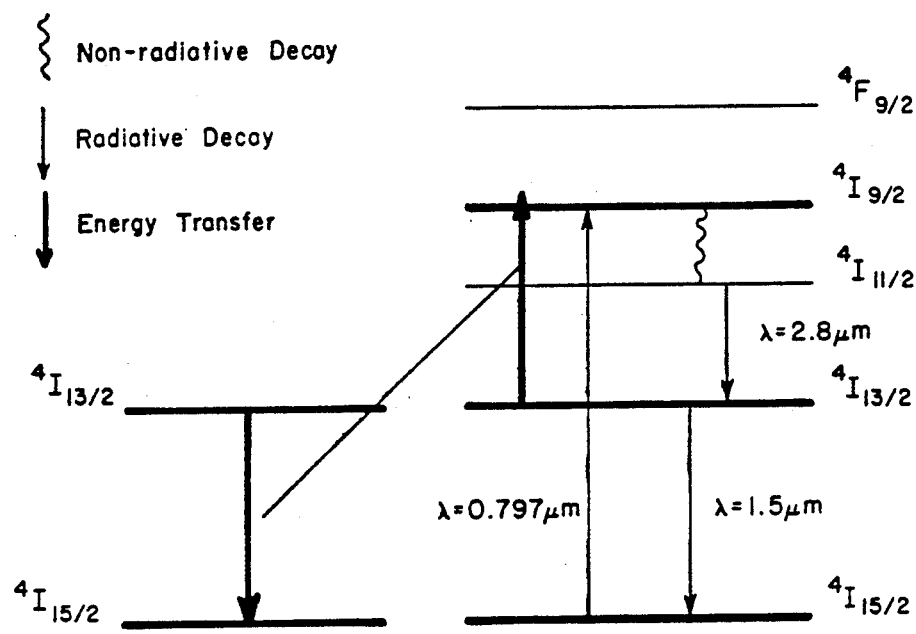
FIG. 3 illustrates the various energy levels of an erbium-doped crystal.

FIG. 3 illustrates the various energy levels of the erbium-doped crystal 15. More specifically, FIG. 3 is a diagram of the various energy levels for Er3+ in LiYF$_4$ (Er:YLF) showing the laser diode pumping scheme with the wavelength of 797 nm, the 2.8 micron output laser emission, and a cooperative (or cross-relaxation) upconversion conversion process. [$^4I_{13/2}$,$^4I_{13/2}$]→[$^4I_{9/2}$,$^4I_{15/2}$].

As shown in FIG. 3, the 797 nm pump beam, which is focused into the crystal 15, causes electrons to move from the $^4I_{15/2}$ level to the $^4I_{9/2}$ level. The $^4I_{9/2}$ level has a very short lifetime and the electrons do not stay at that level very long, but rapidly drop down to the $^4I_{11/2}$ level. This $^4I_{11/2}$ level is the upper laser level. As the electrons move from this upper laser level to the $^4I_{13/2}$ level, which is the lower laser level, they emit photons at 2.8 microns, producing the output laser emission at 2.8 microns. This movement of electrons from the upper laser level to the lower laser level is called the laser transition and it is during this laser transition that the crystal 15 produces an output laser emission at 2.8 microns.

The laser transition is normally self-terminating but the previously mentioned upconversion process takes place. When the percent concentration of the erbium activator ion in the selected host material (the exemplary LiYF$_4$ in FIG. 3) is between 25% and 65%, this upconversion process is maximized. This upconversion process depopulates the lower laser level at $^4I_{13/2}$ and populates the upper laser level at $^4I_{11/2}$, allowing this laser transition to operate in a CW mode. This upconversion process involves a nearly resonant energy transfer between two ions in the $^4I_{13/2}$ level, promoting one of them to the $^4I_{9/2}$ level and reducing the other to the $^4I_{15/2}$ level. Again the electrons at the $^4I_{9/2}$ level rapidly drop to the $^4I_{11/2}$ and the operation repeats with another laser transition from the $^4I_{11/2}$ level to the $^4I_{13/2}$ level.

When the laser diode driver 13 (FIG. 2) is CW operated, the 797 nm pump beam continuously causes the electrons to move from the $^4I_{15/2}$ level to the $^4I_{9/2}$ level and the operation continuously repeats for such CW operation. On the other hand, when the laser diode driver 13 (FIG. 2) is in a pulsed mode of operation, the output 2.8 micron laser emission from the crystal 15 is also pulsed, but by the same operation discussed above.

Figure 4:
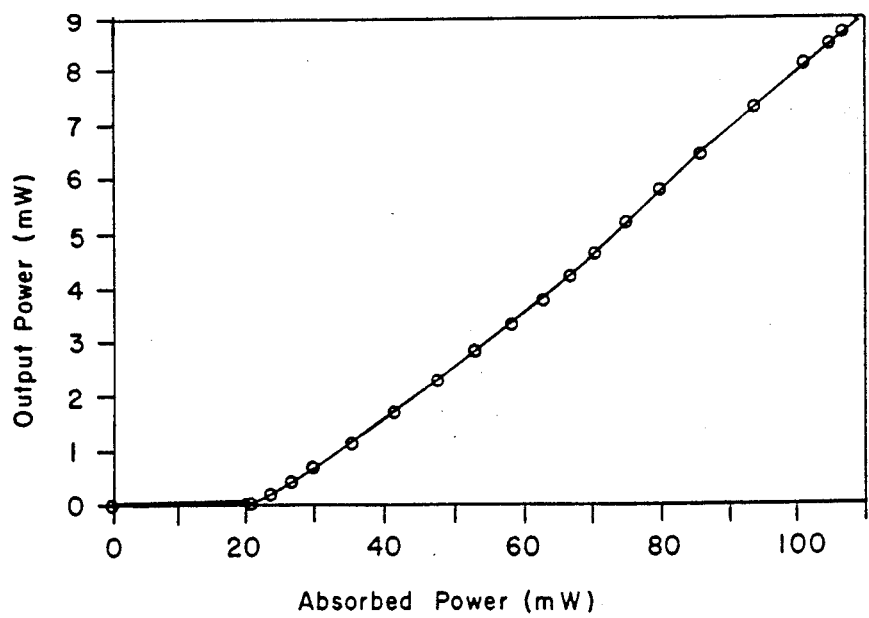
FIG. 4 illustrates the slope efficiency data for a 30% erbium-doped LiYF$_4$ crystal pumped by a 797 nanometer (nm) pump beam.

FIG. 4 illustrates the slope efficiency data for a 30% erbium-doped LiYF$_4$ crystal pumped by a 797 nm pump beam. The horizontal axis, or abscissa, shows the amount of power in mW that is absorbed by the crystal 15 from the pump beam, while the vertical axis, or ordinate, shows the output power in mW produced by the laser crystal in response to the absorbed power of the crystal. Slope efficiency can be defined as the the ratio of the change in the output power to the change in the absorbed power that produced the change in the output power. Thus, a 40 mW change in absorbed power from 60 mW to 100 mW produces a change of approximately 4 mW in the output power. Therefore, the calculated slope efficiency from such changes in power is approximately 0.1 or approximately 10%.

Therefore, what has been described in a preferred embodiment is a laser diode pumped, solid state laser which comprises at least one laser diode (or at least one laser diode array) for emitting a pump beam at a preselected wavelength, and a crystal laser having a preselected host material doped with a predetermined percent concentration of erbium activator ions sufficient to produce a laser emission from the crystal laser at substantially 2.8 microns at a slope efficiency of at least 5%, but preferably at least 10%, when the crystal laser is pumped by the pump beam at the preselected wavelength.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by letters patent of the United States is:

1. A laser diode-pumped, solid-state laser for producing a laser emission at a wavelength of substantially 2.8 microns, said laser comprising:
   laser diode means for emitting a pump beam at a preselected wavelength;
   a crystal; and
   a laser cavity defined by first and second reflective elements at opposing ends of said crystal to form a reflective path therebetween;
   said crystal having a preselected host material doped with a predetermined percent concentration of erbium activator ions sufficient to produce a laser emission at substantially 2.8 microns when said crystal is pumped by said pump beam, a portion of said laser emission at substantially 2.8 microns being outputted from one of said first and second reflective elements at a slope efficiency of at least substantially 5 percent when said crystal is pumped by said pump beam.

2. The laser of claim 1 wherein:
said host material is selected from the group consisting of LiYF$_4$, BaY$_2$F$_8$, KY$_3$F$_{10}$, YF$_3$, Na$_4$Y$_6$F$_{2.2}$, GSGG, GSAG and similar fluoride and oxide host materials with Debye temperatures comparable to that of LiYF$_4$.

3. The laser of claim 1 wherein:
said host material is selected from the group consisting of LiYF$_4$ and BaY$_2$F$_8$; and
said crystal produces the laser emission at a slope efficiency of at least 10%.

4. The laser of claim 3 wherein:
said host material is doped with a predetermined percent concentration of erbium activator ions between 25 percent and 65 percent.

5. The laser of claim 3 wherein:
said host material is doped with approximately a 30 percent concentration of erbium activator ions.

6. The laser of claim 1 wherein:
said host material is LiYF$_4$.

7. The laser of claim 6 wherein:
said host material of LiYF$_4$ is doped with a predetermined percent concentration of erbium activator ions between 25 percent and 65 percent.

8. The laser of claim 6 wherein:
said host material of LiYF$_4$ is doped with approximately a 30 percent concentration of erbium activator ions.

9. The laser of claim 1 wherein said laser diode means includes:
at least one laser diode for producing the pump beam at said preselected wavelength.

10. The laser of claim 9 wherein:
said at least one laser diode produces the pump beam at a preselected wavelength of approximately 797 nm.

11. The laser of claim 10 wherein:
said at least one laser diode is comprised of GaAlAs.

12. The laser of claim 11 wherein:
said host material is selected from the group consisting of LiYF$_4$, BaY$_2$F$_8$, KY$_3$F$_{10}$, YF$_3$, Na$_4$Y$_6$F$_{2.2}$, GSGG and GSAG.

13. The laser of claim 11 wherein:
said host material is selected from the group consisting of LiYF$_4$ and BaY$_2$F$_8$.

14. The laser of claim 11 wherein:
said host material is LiYF$_4$.

15. The laser of claim 1 wherein said laser diode means includes:
at least one laser diode array for producing the pump beam at said preselected wavelength.

16. The laser of claim 15 wherein:
said at least one laser diode array produces the pump beam at a preselected wavelength of approximately 797 nm.

17. The laser of claim 16 wherein:
each laser diode in said at least one laser diode array is comprised of GaAlAs; and
said host material is selected from the group consisting of LiYF$_4$, BaY$_2$F$_8$, GSGG and GSAG.

18. The laser of claim 16 wherein:
each laser diode in said at least one laser diode array is comprised of GaAlAs; and
said host material is selected from the group consisting of LiYF$_4$ and BaY$_2$F$_8$.

19. The laser of claim 1 further including:
optical means disposed between said laser diode means and said crystal for matching the pump beam to said crystal.

20. The laser of claim 19 wherein said optical means includes:
a first lens for collecting the pump beam;
a second lens for collimating the collected pump beam; and a third lens for matching the collimated, collected pump beam to said crystal.

21. The laser of claim 1 further including:
temperature control means for maintaining said laser diode means at a preselected temperature.

22. The laser of claim 21 wherein:
said temperature control means maintains said laser diode means at room temperature.

23. The laser of claim 1 wherein said laser diode means produces the pump beam at a preselected wavelength of substantially 797 nm, and said laser of claim 1 further including:
a filter disposed at the output of said crystal for substantially passing only the laser emission at substantially 2.8 microns from said crystal.

24. A laser diode-pumped, solid-state laser for producing a laser emission at a wavelength of substantially 2.8 microns, said laser comprising:
laser diode means for emitting a pump beam at a wavelength of substantially 797 nm;
a crystal; and
a laser cavity defined by first and second reflective elements at opposing ends of said crystal to form a reflective path therebetween;
said crystal having a host material selected from the group consisting of $LiYF_4$, $BaY_2F_8$, $KY_3F_{10}$, $YF_3$, $Na_{.4}Y_{.6}F_{2.2}$, GSGG and GSAG, said host material being doped with a predetermined percent concentration of erbium activator ions between 25 percent and 65 percent, said erbium-doped crystal being responsive to said pump beam for producing an output laser emission at substantially 2.8 microns and at a slope efficiency of at least 5 percent.

25. The laser of claim 24 wherein:
said erbium-doped crystal is responsive to said pump beam at substantially 797 nm for producing a laser emission corresponding to the $^4I_{11/2}$-$^4I_{13/2}$ laser transition having the wavelength of substantially 2.8 microns and at a slope efficiency of at least 10%.

26. A method for producing a laser emission at a wavelength of substantially 2.8 microns, said method comprising the steps of:
forming a crystal having a host material doped with a predetermined percent concentration of erbium activator ions sufficient to produce a laser emission at substantially 2.8 microns when the crystal is pumped at a preselected wavelength;
defining a laser cavity by disposing first and second reflective elements at opposing ends of the crystal to form a reflective path therebetween for the laser emission at substantially 2.8 microns when the crystal is pumped at the preselected wavelength;
generating a pump beam of optical radiation at the preselected wavelength from at least one laser diode; and
directing the pump beam of optical radiation into the erbium-doped host material of the crystal to produce an output laser emission at substantially 2.8 microns at a slope efficiency of at least 5 percent.

27. The method of claim 26 further including the steps of:
selecting the host material from the group consisting of YLF, $BaY_2F_8$, GSGG and GSAG; and
doping the host material with a predetermined percent concentration of erbium activator ions between 25 percent and 65 percent.

28. The method of claim 27 wherein said generating step includes the step of:
selecting the pump beam of optical radiation to have a wavelength of substantially 797 nm.

29. The method of claim 26 wherein said directing step produces the laser emission at a slope efficiency of at least 10%, said method further including the steps of:
selecting YLF as the host material; and
doping the YLF host material with approximately a 30 percent concentration of erbium activator ions.

30. The method of claim 29 wherein said generating step includes the step of:
selecting the pump beam of optical radiation to have a wavelength of substantially 797 nm.

* * * * *